United States Patent [19]
Hirai

[11] Patent Number: 5,193,022
[45] Date of Patent: Mar. 9, 1993

[54] PLANE-TYPE DISPLAY APPARATUS

[75] Inventor: Minoru Hirai, Kyoto, Japan

[73] Assignee: Rohm Co., Ltd., Kyoto, Japan

[21] Appl. No.: 841,165

[22] Filed: Feb. 25, 1992

[30] Foreign Application Priority Data

Feb. 26, 1991 [JP] Japan .................................. 3-030544
Feb. 26, 1991 [JP] Japan .................................. 3-030548

[51] Int. Cl.⁵ .............................................. G02F 1/13
[52] U.S. Cl. .......................................... 359/88; 359/82
[58] Field of Search .................. 359/87, 88, 89, 63, 359/74, 82

[56] References Cited

U.S. PATENT DOCUMENTS

| | | | |
|---|---|---|---|
| 4,862,153 | 8/1989 | Nakatani et al. | 359/82 |
| 4,917,466 | 4/1990 | Nakamura et al. | 359/88 |
| 5,016,986 | 5/1991 | Kawashima et al. | 359/87 |
| 5,042,919 | 8/1991 | Yabu et al. | 359/88 |

FOREIGN PATENT DOCUMENTS

| | | | |
|---|---|---|---|
| 0121316 | 7/1984 | Japan | 359/88 |
| 0210419 | 11/1984 | Japan | 359/88 |
| 0057931 | 3/1986 | Japan | 359/88 |

*Primary Examiner*—William L. Sikes
*Assistant Examiner*—Huy K. Mai
*Attorney, Agent, or Firm*—Nikaido, Marmelstein, Murray & Oram

[57] ABSTRACT

A display apparatus of plane type includes a display panel, a drive signal supplying board arranged opposite to the display panel at a predetermined space therefrom for supplying a drive signal for the display panel, a drive integrated circuit device mounted on the board through a flexible plate and connected to a connecting portion of the display panel through the flexible plate, a first polarizing plate arranged on the upper surface of the display panel, and a second polarizing plate arranged to the under surface of the display panel and extending to the under surface of the drive signal supplying board to be fixed thereto.

3 Claims, 5 Drawing Sheets

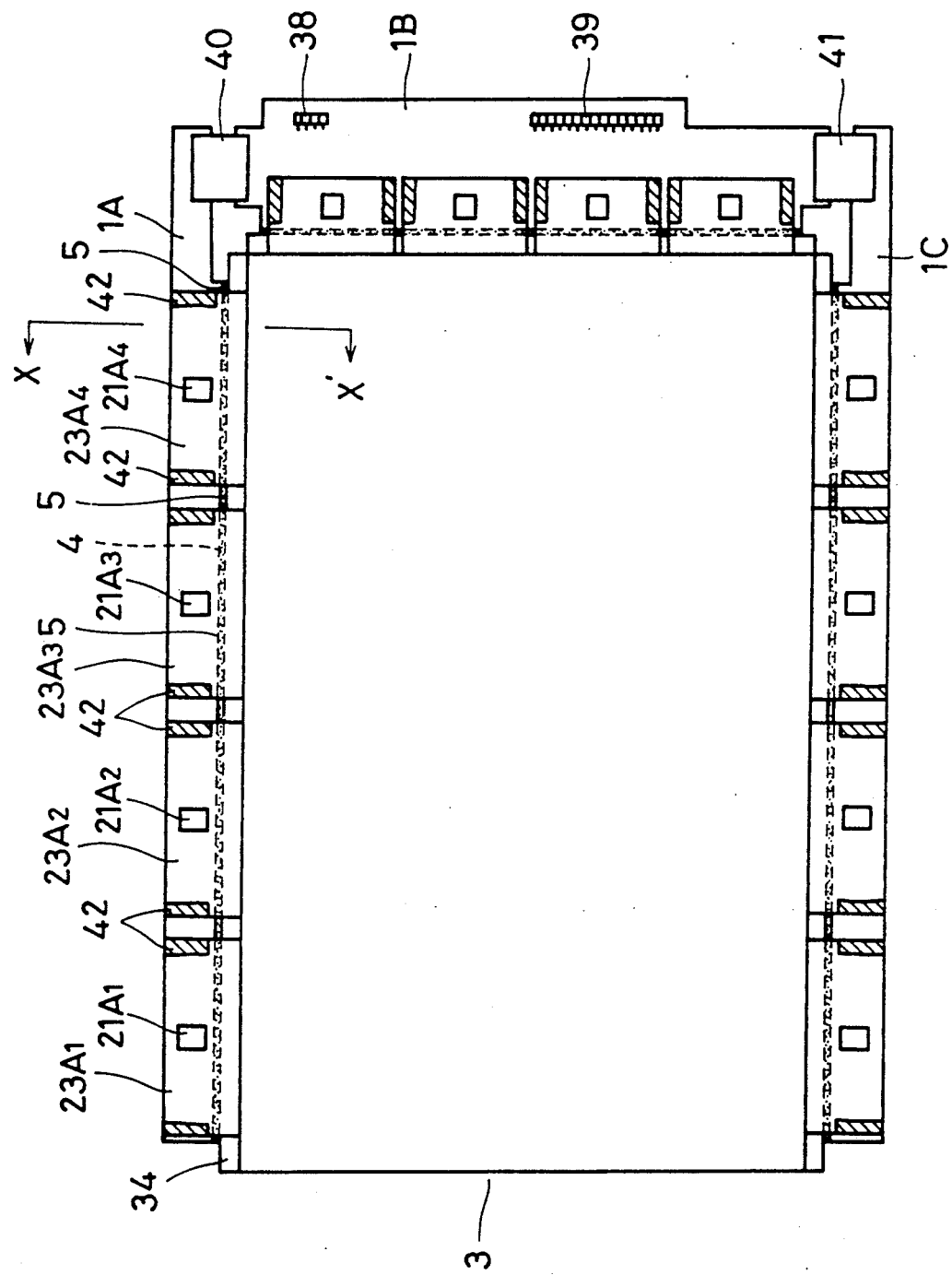

PLANE-TYPE DISPLAY APPARATUS

BACKGROUND OF THE INVENTION

1. Field of the Invention

The present invention relates to a display apparatus of plane type such as a liquid crystal display apparatus, a plasma display apparatus or an EL (electro-luminescent) display apparatus.

2. Description of the Prior Art

In recent years, display apparatuses of plane type have widely been used. Of such apparatuses, a display apparatus employing a liquid crystal to be applied to various display means is most expected.

FIG. 1 is a view showing a main portion of a conventional liquid crystal display apparatus.

This liquid crystal display apparatus is constituted by a liquid crystal panel 3 having polarizing plates 36 and 37 on its upper and under surfaces, respectively, a drive signal supplying board (printed circuit board) 1 arranged on the same plane where the liquid crystal panel 3 is arranged and at a predetermined distance (a space 4) from the liquid crystal panel 3, and a drive integrated circuit device (LSI) 21 mounted on a printed circuit board 1 through a flexible plate 23 on whose under surface a lead pattern 2 is formed and connected to a connecting portion 32 of the liquid crystal panel 3. The drive integrated circuit device 21 is mounted on the printed circuit board 1 with a tape automated bonding (TAB) method.

The liquid crystal panel 3 is made, as is well-known, by enclosing a liquid crystal material 30 between two glass plates 33 and 34 arranged one above another. The numeral 35 represents a seal for sealing the liquid crystal material 30. On the facing planes of the glass plates 33 and 34, a transparent conductive coat such as tin oxide or indium oxide is formed (not shown). The coat on the eye side is etched in shapes of segments for figures/letters. From each segment, an electrode lead protrudes toward the connecting portion 32 of the liquid crystal panel 3. This electrode lead is electrically coupled to the TAB-packaged drive integrated circuit device 21 through the lead pattern 2. To the drive integrated circuit device 21, an input signal is supplied through the printed circuit board 1. Based on the input signal, a voltage is applied between both electrodes of the liquid crystal panel 3, so that the alignment of liquid crystal molecules is changed and the color thereof becomes different from that of the portions where the voltage is not applied. Thereby, figures/letters are displayed.

However, according to the above-described conventional liquid crystal display apparatus, the drive signal supplying board (printed circuit board) 1 and the connecting portion 32 of the liquid crystal panel 3 are arranged with a predetermined space 4 therebetween. Above the space 4, the flexible plate 23 is arranged for connecting the drive integrated circuit device 21 to the connecting portion 32 of the liquid crystal panel. The liquid crystal display apparatus fixes the liquid crystal panel 3 to an external frame thereof. The printed circuit board 1 is supported by the liquid crystal panel 3 through the flexible plate 23. Because of this arrangement, when external force such as vibration and shock acts on the printed circuit board 1, all the stress of the external force is concentrated on the connecting portion 32 and the portions of the flexible plate 23 which is located over the space 4. As a result, there is a disadvantage as shown in FIG. 2 that the connecting portion 32 and the lead pattern 2 of the flexible plate 23 which are arranged over the space 4 are disconnected, or that a fault occurs due to a breaking of the lead pattern 2.

SUMMARY OF THE INVENTION

An object of the present invention is to provide a display apparatus of simple structure and with a high performance reliability where there is no possibility that disconnection or a fault occurs due to external force such as vibration and shock.

To achieve the above-mentioned object, a display apparatus of the present invention is provided with: a display panel; a drive signal supplying board arranged opposite to said display panel at a predetermined space therefrom for supplying a drive signal for the display panel; a drive integrated circuit device mounted on the board through a flexible plate and connected to a connecting portion of said display panel through the flexible plate; a first polarizing plate arranged on the upper surface of said display panel; and a second polarizing plate arranged to the under surface of said display panel and extending to the under surface of said drive signal supplying board to be fixed thereto.

BRIEF DESCRIPTION OF THE DRAWINGS

This and other objects and features of this invention will become clear from the following description taken in conjunction with the preferred embodiments with reference to the accompanied drawings in which:

FIG. 6 is a plan view of an entire liquid crystal display apparatus employing the arrangement of FIG. 5.

DESCRIPTION OF THE PREFERRED EMBODIMENTS

Figure 3:
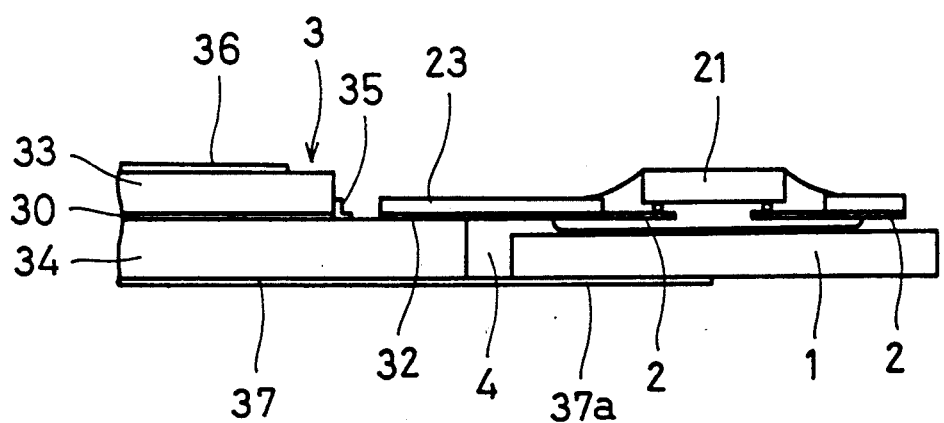
FIG. 3 is a cross-sectional view of a liquid crystal display apparatus embodying the present invention.

FIG. 3 shows a main portion of a liquid crystal display apparatus which is a first embodiment of the present invention.

Figure 1:
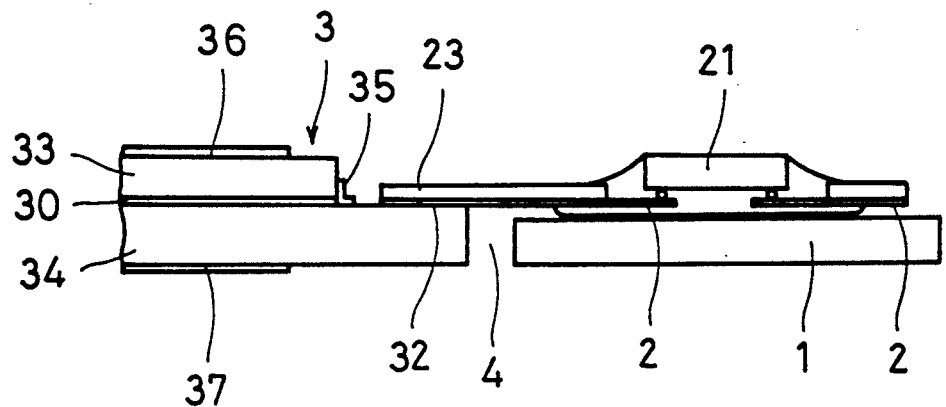
FIG. 1 is a cross-sectional view of a conventional liquid crystal display apparatus.
Figure 2:
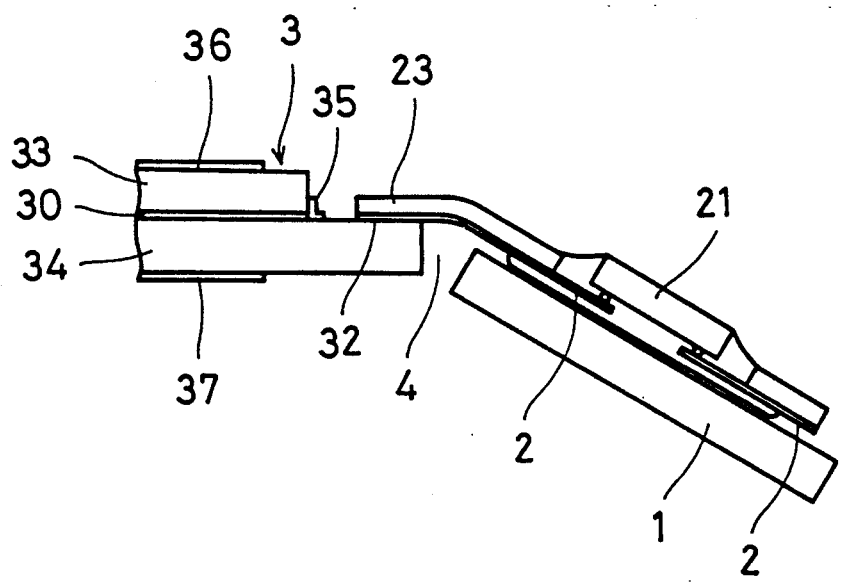
FIG. 2 is an explanatory view showing a case where external force is acting on the conventional liquid crystal display apparatus.

Similarly to the prior art (FIG. 1), this liquid crystal display apparatus is constituted as conventionally known by a liquid crystal panel 3 provided with polarizing plates 36 and 37 on its upper and under surfaces, a drive signal supplying board (printed circuit board) 1 arranged on the same plane where the liquid crystal panel 3 is arranged and opposite to the liquid crystal panel 3 at a predetermined distance (a space 4) therefrom, and a drive integrated circuit device (LSI) 21 mounted on the printed circuit board 1 through a lead pattern 2 of a flexible plate 23 and connected to a connecting portion 32 of the liquid crystal panel 3.

The liquid crystal panel 3 is made by enclosing a transparent liquid crystal material 30 between two glass plates 33 and 34 arranged one above another. The numeral 35 represents a seal for sealing the liquid crystal material 30. On the surface of each glass plate, a transparent conductive coat such as tin oxide and indium oxide is formed (not shown). The coat on the eye side, that is, on the upper glass is etched in shapes of segments for figures/letters. From each segment, an electrode lead protrudes toward the connecting portion 32 of the liquid crystal panel 3. The electrode lead is electrically coupled to the drive integrated circuit device (LSI) 21 through the lead pattern 2 of the flexible plate 23. To the drive integrated circuit device 21, an input signal is supplied through the printed circuit board 1. Based on the input signal, a voltage is applied between both electrodes of the liquid crystal panel 3, so that the alignment of liquid crystal molecules is changed and the color thereof becomes different from that of the portions where the voltage is not applied. Thereby, figures/letters are displayed.

A feature of this embodiment is that the lower polarizing plate (polar screen) 37 of the liquid crystal panel 3 provided with the polarizing plates 36, 37 on its upper and under surfaces is extended toward the printed circuit board 1 and that the extended portion 37a is glued to the under surface of the printed circuit board 1.

In a liquid crystal display apparatus provided with the above-described feature, the display panel 3 and the printed circuit board 1 are linked together through the extended portion 37a of the polarizing plate 37. Thereby, external force such as vibration and shock applied to the printed circuit board 1 is dispersedly absorbed on the whole of the printed circuit board 1 and liquid crystal panel 3 which are linked together. That is, it can be prevented that stress is concentrated on the flexible plate 23 and the lead pattern 2 thereof which are located over the space 4 and which are weakest against external force. Thus, disconnection from the connecting portion 32 due to external shock, and a fault due to a breaking of the lead pattern 2 of the flexible plate 23 can be prevented.

Figure 4:
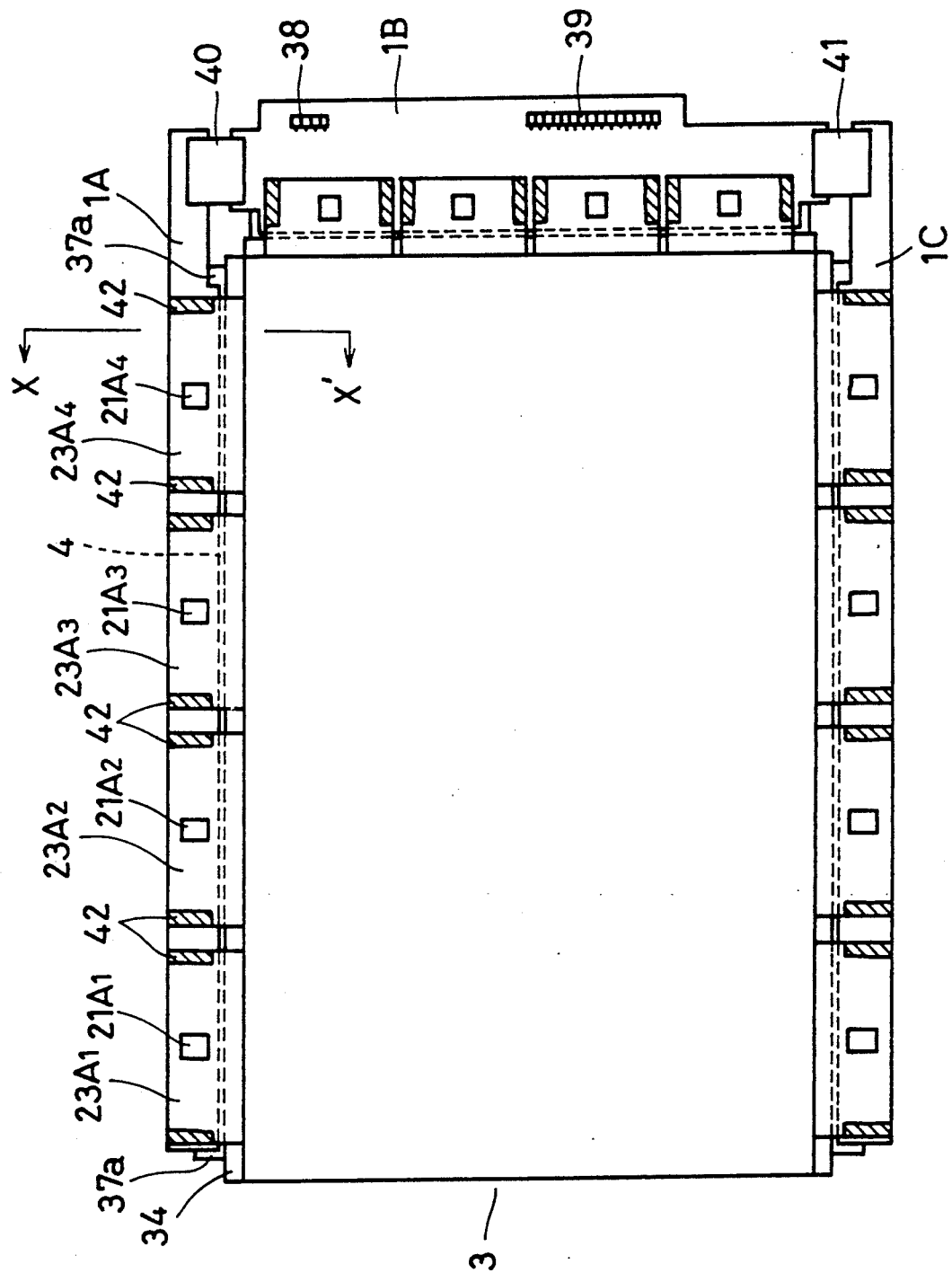
FIG. 4 is a plan view of an entire liquid crystal display apparatus employing the arrangement of FIG. 3.

FIG. 4 is a plan view of an entire liquid crystal display apparatus employing an arrangement the same as that of FIG. 3. In FIG. 4, printed circuit boards 1A, 1B and 1C are fixed on the upper, right and lower edges of the liquid crystal panel 3, respectively, through the flexible plate and the lower polarizing plate of the liquid crystal panel 3.

Since the printed circuit boards 1A, 1B and 1C are fixed with the same arrangement, only the fixing arrangement of the printed circuit board 1A fixed on the upper edge will be described.

On the printed circuit board 1A, four flexible plates $23A_1$, $23A_2$, $23A_3$ and $23A_4$ are soldered for the connection. The numeral 42 indicates the portions of the soldering. To these flexible plates $23A_1$ to $23A_4$, drive integrated circuit devices $21A_1$, $21A_2$, $21A_3$ and $21A_4$ are previously mounted, respectively, by the tape automated bonding (TAB) method. The flexible plates $23A_1$ to $23A_4$ are fixed to connecting portions on a glass plate 34 of the liquid crystal panel 3. The extended portion 37a of the lower polarizing plate 37 of the liquid crystal panel 3 mentioned with reference to FIG. 3 is fixed on the under surface of the printed circuit board 1A. In FIG. 4, a pair of parallel dotted lines indicates that the space therebetween is the space 4. A view taken on the line X—X' of FIG. 4 corresponds to FIG. 3.

Connectors 38 and 39 provided to the printed circuit board 1B fixed to the right edge of the liquid crystal panel 3 are for electrical connection to an external portion. The connector 38 is a connector for power source and the connector 39 is a connector for signals.

A power voltage and a signal received by the printed circuit board 1B are supplied not only to drive integrated circuit devices arranged on the printed circuit board 1B but also to the printed circuit boards 1A and 1C through belt-shaped flexible plates 40 and 41 having jumper lines and further to the drive integrated circuit devices arranged thereon.

The liquid crystal panel 3 of FIG. 4 has 640×400 picture elements. The 640×200 picture elements arranged on the upper half thereof are driven by the four drive integrated circuit devices $21A_1$ to $21A_4$ (which are capable of driving up to 160 picture elements, respectively) arranged on the printed circuit board 1A and by two of the drive integrated circuit devices (which are capable of driving up to 100 picture elements, respectively) arranged on the printed circuit board 1B. Moreover, the 640×200 picture elements arranged on the lower half of the liquid crystal panel 3 are similarly driven by the four drive integrated circuit devices arranged on the printed circuit board 1C and by the other two drive integrated circuit devices arranged on the printed circuit board 1B.

Subsequently, in a second embodiment of the present invention shown in FIG. 5, resin, for example adhesive resin such as epoxy resin and acrylic resin is filled into the space 4 between the liquid crystal panel 3 and the printed circuit board 1, and the liquid crystal panel 3 is linked with the printed circuit board 1 through the resin 5. That is, an end portion of the connecting portion 32 of the liquid crystal panel 3 is linked with an opposite end portion of the printed circuit board 1 through the resin 5.

In a liquid crystal display apparatus provided with the above-described feature, the liquid crystal panel 3 is linked with the printed circuit board 1 through the resin 5. Thereby, external force such as vibration and shock applied to the printed circuit board 1 is dispersedly absorbed on the whole of the printed circuit board 1 and liquid crystal panel 3 linked with each other. That is, it can be prevented that stress is concentrated on the flexible plate 23 and the lead pattern 22 which are located over the space 4 and weakest against external force. Thus, disconnection of the liquid crystal panel connecting portion 32 from the lead pattern 2 of the flexible plate 23 due to external shock, and a fault due to a breaking of the lead pattern 2 of the flexible plate can be prevented.

Figure 5:
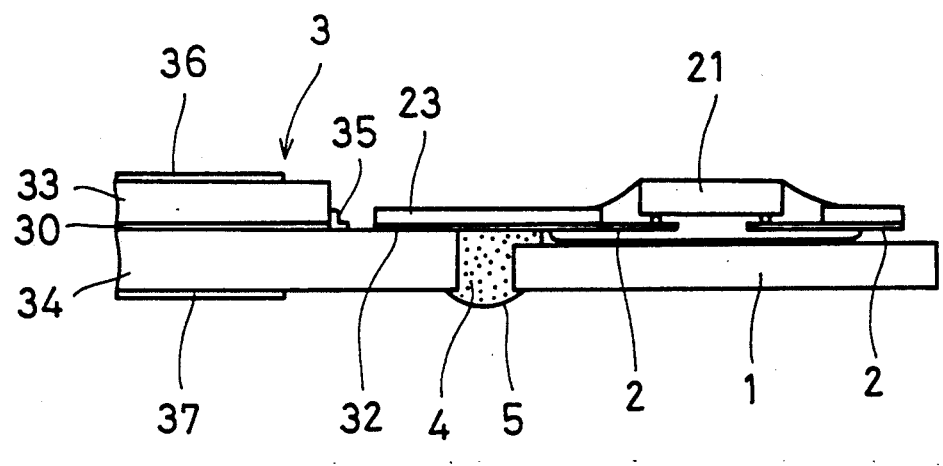
FIG. 5 is a cross-sectional view of another liquid crystal display apparatus embodying the present invention.

The embodiment of FIG. 5 may be similarly applied to plasma displays and EL displays.

FIG. 6 is a plan view of an entire liquid crystal display apparatus employing an arrangement the same as that of FIG. 6. In FIG. 6, portions the same as those of FIG. 4 are represented by the same reference designations. Instead of providing the extended portion 37a of the polarizing plate 37 of FIG. 4, the resin 5 is filled into the space 4 in FIG. 6. A view taken on the line X—X' of FIG. 6 corresponds to FIG. 5.

Obviously, many modifications and variations of the present invention are possible in light of the above teachings. It is therefore to be understood that within the scope of the appended claims, the invention may be practiced other than as specifically described.

What is claimed is:

1. A display apparatus comprising:
   a display panel;
   a drive signal supplying board arranged opposite to said display panel at a predetermined space therefrom for supplying a drive signal for the display panel;

a drive integrated circuit device mounted on the board through a flexible plate and connected to a connecting portion of said display panel through the flexible plate;

a first polarizing plate arranged on the upper surface of said display panel; and a second polarizing plate arranged to the under surface of said display panel and extending to the under surface of said drive signal supplying board to be fixed thereto.

2. A display apparatus according to claim 1, wherein said display panel is a liquid crystal panel.

3. A display apparatus comprising:

a display panel;

a drive signal supplying board arranged opposite to the display panel at a predetermined space therefrom for supplying a drive signal for the display panel; and a drive integrated circuit device mounted on the board through a flexible plate and connected to a connecting portion of said display panel through a lead pattern of the flexible plate; and resin filled into said space and fixing said display panel and said drive signal supplying board.

* * * * *